United States Patent [19]
Fournier et al.

[11] Patent Number: 5,210,801
[45] Date of Patent: May 11, 1993

[54] ENVIRONMENTALLY PROTECTED INTEGRATED OPTICAL COMPONENT AND ITS PRODUCTION PROCESS

[75] Inventors: Adeline Fournier, Vizille; Pierre Gidon, Echirolles; Serge Valette, Grenoble, all of France

[73] Assignee: Commissariat a l'Energie Atomique, Paris, France

[21] Appl. No.: 673,386

[22] Filed: Mar. 22, 1991

[30] Foreign Application Priority Data

Apr. 3, 1990 [FR] France ................... 90 04255

[51] Int. Cl.[5] ............... G02B 6/10; G02B 6/26
[52] U.S. Cl. .................... 385/14; 385/129; 385/132; 385/147; 385/901
[58] Field of Search ........... 350/96.11, 96.12, 96.13, 350/96.14, 96.15, 96.16, 96.18, 96.19; 385/14, 31, 33, 35, 39, 129-132, 147, 901, 16, 17

[56] References Cited

U.S. PATENT DOCUMENTS

| | | | |
|---|---|---|---|
| 4,195,907 | 4/1980 | Zamja et al. | 350/96.15 X |
| 4,740,951 | 4/1988 | Lizet et al. | 350/96.11 X |
| 4,865,453 | 9/1989 | Gidon et al. | 350/96.11 X |
| 4,888,785 | 12/1989 | Lee | 350/96.11 X |
| 4,932,743 | 6/1990 | Isobe et al. | 350/96.19 |
| 4,961,617 | 10/1990 | Shahidi et al. | 350/96.12 X |
| 4,988,157 | 1/1991 | Jackel et al. | 385/17 |
| 5,074,629 | 12/1991 | Zdeblick | 385/14 |

FOREIGN PATENT DOCUMENTS

| | | |
|---|---|---|
| 0196948 | 10/1986 | European Pat. Off. . |
| 0286528 | 10/1988 | European Pat. Off. . |
| 62-94823 | 5/1987 | Japan . |

Primary Examiner—Akm E. Ullah
Attorney, Agent, or Firm—Oblon, Spivak, McClelland, Maier & Neustadt

[57] ABSTRACT

An environmentally protected integrated optical component and its production process is disclosed. The component has at least one cavity (26a) isolated from the environment formed in at least one light guide layer (16, 18), with the cavity being filled with a fluid or a polymer (27) having a refractive index which is different or which can be made different from the refractive index of the layer. In particular, the cavity is filled with air. The component can be a splitting plate, a mirror, a grating, a microguide or a lens.

53 Claims, 8 Drawing Sheets

ENVIRONMENTALLY PROTECTED INTEGRATED OPTICAL COMPONENT AND ITS PRODUCTION PROCESS

DESCRIPTION

The invention relates to an active or passive optical component for integrated optics, as well as to its production process. It can more particularly be used in the field of processing radar signals in real time, e.g. in correlators, spectrum analyzers or interferometers, in the field of optical telecommunications, e.g. for multiplexing or demultiplexing light signals and in the field of optical fibre sensors.

The integrated optical component according to the invention can be a mirror, a beam splitting plate, a diffraction grating, a focusing lens, a microguide and all integrated optical components using diffraction gratings, such as e.g. optical couplers. These optical couplers can in particular be used in polarization seperators and polarization converters.

In general terms, it is very difficult to produce integrated optical components in light guides to the extent that the effective index variations which affect the guided light signals are relatively small. This makes it necessary to work in geometrical conditions of a special nature or to define new types of components adapted to particular problems to be solved.

Figure 1:
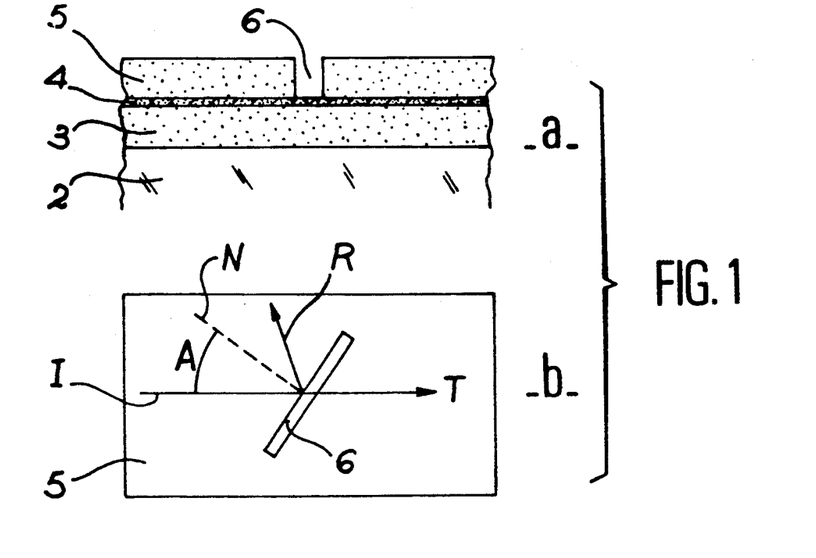

In a complete integrated optical system, use is very often made of a beam splitting plate. An example of the production of a splitting plate in integrated optics such as described in FR-A-2 613 826 filed by the present Applicant is shown in FIG. 1. Part a of FIG. 1 is a sectional view of the splitting plate and part b a plan view.

The light guide in which the splitting plate is formed is constituted (part a) by a silicon substrate 2, above which is placed an undoped silica buffer layer 3, followed by a $Si_3N_4$ guide layer 4 with a refractive index higher than that of the layer 3. An upper, undoped silica layer 5 with a refractive index lower than that of the guide layer 4 completes the structure of the guide. The splitting plate 6 consists of a trench made in the upper layer 5, whose depth, in the present representation, is equal to the thickness of the upper layer 5.

Two different guide structures can be defined in this embodiment, namely a $Si/SiO_2/Si_3N_4/SiO_2$ structure (1) of effective index N1eff and a $Si/SiO_2/Si_3N_4/air$ structure with an effective index N2eff. The effective index of a structure is dependent on the refractive index of the layers forming it and of their thickness.

In part b of FIG. 1, I represents the incident light beam, R the reflected light beam, T the light beam transmitted by the plate 6 and N the perpendicular to the plate 6. These beams are carried by the guide layer 4.

It is only possible to have a high reflection coefficient R at the interface of the structures (1) and (2) if the angle of incidence A is close to or higher than the limit angle Al. The total reflection limit angle Al, such as can be calculated in a plane wave model is defined by the equation (1):

$$Al = Arc\sin N2eff/N1eff \quad (1)$$

The greater the variation of the effective index N1eff-N2eff, the more the angle Al moves away from n/2.

In the embodiment of FIG. 1 and for a wavelength of the incident beam of 800 nm and a thickness of the guide layer 4 of 160 nm, N1eff is obtained close to 1.69 and N2eff close to 1.65 and consequently Al is approximately 77°.

On replacing air by $MgF_2$, which has a refractive index of 1.38 and which is lower than that of undoped silica which is approximately 1.45, an effective index N2eff of 1.68 is obtained and consequently an angle Al of approximately 84°. This replacement of air by $MgF_2$ is known from the aforementioned document.

The use of air as the upper layer of the light guide and with a refractive index of 1 makes it possible to obtain high effective index variations and therefore makes it possible to work at low incidence angles. The interest of working with the minimum limit angles Al permits a better separation of the transmitted and reflected beams increasing the angles separating them. Unfortunately, such a splitting plate using as the upper layer air is not protected from all external pollution.

These problems also exist for other guide structures, i.e. for materials other than those given hereinbefore, as well as for trenches 6 extended in to the guide layer 4 or even into the buffer layer 3.

Thus, these disadvantages also exist for diffraction gratings which are only constituted by a succession of equidistant splitting plates, which are components widely used in integrated optics, as well as for mirrors and focussing lenses.

At present few solid materials are known which have a refractive index below that of silica and which would make it possible to replace air in the guiding structure, which considerably limits the production of integrated optical components in said material.

At present, only $MgF_2$ is known for replacing air in the guide structures 1 and 2. Unfortunately the production of this material is not easy because it cracks as soon as its thickness exceeds 200 to 300 nm and the effective index differences induced by it are generally inadequate.

It is also not possible to produce monomode structures compatible both with laser diodes and with optical fibres. Thus, laser diodes use guiding structures having very high refractive index variations between the core and the surrounding medium, whereas optical fibres have low refractive index variations of approximately $4.10^{-3}$ to $10^{-2}$. Consequently, the confinement of the light is very different, namely 1 micrometer or less (in the junction direction) or the laser diode and 5 to 9 micrometers for the optical fibres.

In addition, to connect these elements to the same waveguide, it would be necessary for the latter to be both a low index variation guide and a high index variation guide as a function of the type of element to be connected. However, this is not possible with a single guide structure and can only be obtained with two coupled guide structures.

Unfortunately it is very difficult to exchange light energy between two light guides having very different guided mode profiles and the efficiency levels obtained are very low. Thus, this energy transfer can be realised in known manner by an end-to-end coupling in which the integral of the superimpositions between the light amplitudes of the two guided modes is very low (consequently low efficiency) or by a co-directional coupling, but then the propagation constants (in particular the phase velocity) of the guided modes in the two light guides differ very significantly, which does not permit the coupling. In a co-directional coupling, the two guide structures are stacked.

It is known to improve the co-directional coupling of two guide structures by using a periodic structure of the grating type, which ensures the adaptation of the propagation velocity between the modes to be coupled. Such a coupling is in particular described in FR-A-2 579 044 filed in the name of the Applicant. The disadvantage of this method is that it leads to a waveguide sensitivity which can be very prejudicial during its use in a real optical system.

The invention relates to an integrated optical component and its production process making it possible to obviate the aforementioned disadvantages. In particular, said optical component is protected against the environment, whilst ensuring high effective index variations.

Moreover, when said component is a grating, it can be used for an effective co-directional coupling of two stacked optical guides having widely different guided mode profiles.

Moreover, the component according to the invention can be produced from a much larger number of materials than those of the prior art and its production is much less critical.

More specifically, the invention relates to an environmentally protected integrated optical component having at least one closed cavity isolated from the environment and formed in at least one layer of a light guide, said cavity being filled with a material having a refractive index which is different or which can be made different from the refractive index of the said layer.

The isolation of the components from the external medium makes it possible to produce other technological stages independent of the existence of these components.

The filling material enclosed in the cavity permits a local modification of the effective index of the light guide greater than that obtained in the prior art components. Moreover, this local modification of the effective index is solely fixed by the cavity filling material and is consequently not subject to the polluting disturbances due to the environment. The filling material of the cavity is in particular an organic polymer or fluid. The fluid used can be a gas or a liquid and is refractive index can be higher or lower than that of the layer containing it.

The use of a material with a refractive index lower than that of the layer containing it has the advantage of not modifying the number of guided modes of the initial structure of the light guide, which means that a monomode structure remains monomode compared with the cavity.

Moreover, due to the fact that the index difference created by the cavity is negative, light only exists in an evanescent form in components of the grating or coupler type. This ensures that a good reproducibility of the performances sought as a result of a reduction of the sensitivity to the thickness of the cavity.

However, if it is wished that the initially monomode structure becomes multimode compared with the cavity, although the passage from a monomode to a multimode structure can cause parasitic intermode coupling problems, it is possible to use a material with a refractive index higher than that of the layer containing the filling material.

The gas which can be used is a neutral or inert gas such as e.g. argon, neon, helium, nitrogen, or air or vacuum can be used. All these gases have a refractive index lower than that of silica, equal to or close to 1. Gases also have the advantage of not causing long term chemical reactions with the materials of the integrated structure and therefore do not modify the sought physical properties for the structure.

Advantageously air is used as the filling material. Its refractive index of 1 makes it possible to associate it with a large number of materails and ensure a high effective index difference.

It is also possible to use as the filling material gases or vapours having particularly absorption lines, which can e.g. be optically saturated (the excitation of the energy levels corresponding to said absorption lines), such as helium, neon, rubidium or sodium vapours. The integrated optical component according to the invention makes it possible to use liquid, which was not possible in the prior art components. Thus, it increases the number of possibilities of components to be produced.

Thus, if it is wished to have a given index value, it is much easier to find it among liquids than among solids. Moreover, it is possible to use colouring agents, which are liquids with a very large absorption band. It is therefore possible to produce waveguide-selective absorbers or optical filters.

The use of a liquid in particular makes it possible to produce new components of the optical valve, modulator or deflector type. This is particularly the case when using electrically controllable liquids such as electrolytes or liquid crystals and in particular nematic or C smectic phase liquid crystals.

It is also possible to produce components with a nonlinear response by in particular using $CS_2$. This liquid material has a refractive index (1.65) higher than that of silica. It is also possible to use organic polymers (e.g. polyimide, PMMA) with a refractive index between 1.45 and 1.7, which is also higher than that of silica. $CS_2$ has the advantage of an optically modifiable refractive index. Its index can be modified by the action of a light beam, which can be a guided beam or an external supplementary beam supplied to the structure through the upper layers (which must be transparent to the excitation wavelength) or through the lower layers (which must then be transparent to the excitation wavelength).

In this case, as well as in the case of an electrically controlled filling material, when the material is not controlled it can have the same refractive index as the layer or layers containing it.

The values of the refractive indices referred to during the description correspond to a wavelength of 800 nm.

The optical component according to the invention can be a mirror. In this case, the cavity advantageously extends from the upper layer to the lower layer of the light guide. The optical component according to the invention can also be a beam splitting plate or a focussing lens. The dimensions and shape of the cavity define the optical properties of the component.

For both a lens and a splitting plate, the cavity is located in at least one of the layers of the guide structure. The optical component can also be a microguide intended for the lateral confinement of light.

When the optical component is a diffraction grating, the latter has several cavities preferably arranged parallel to one another and each filled with a material with a different index. These cavities constitute the lines of the grating and are formed in any random one of the layers of the guide structure.

The latter type of component can advantageously be used for coupling two superimposed light guides with a satisfactory energy transfer efficiency.

The coupling force of a grating is proportional to the difference of the refractive index between the fluid material more particularly contained in the cavities and the material in which said cavities are formed. Moreover, the greater the said index difference, the smaller the number of lines.

A diffraction grating with a high coupling coefficient according to the invention makes it possible to couple two superimposed light guides with a very different guided mode profile, a first guide consisting of a first upper layer and a first lower layer, positioned on either side of a first guide layer with a refractive index higher than that of the first upper and lower layers and a second guide consisting of a second upper layer and a second lower layer positioned on either side of a second guide layer with a refractive index higher than that of the second upper and lower layers, the first upper layer and the second lower layer constituting one and the same coupling layer and the grating is located in the coupling layer.

A diffraction grating according to the invention also makes it possible to couple two guides with a very different guided mode profile having a first, a second, a third and a fourth stacked layers, the second and third layers constituting the guide layers respectively of the first and second guides and having refractive indices higher than those of the first and fourth layers, the refractive index of the second layer also being different from that of the third layer, said third layer having cavities filled with a material with a different refractive index or whose refractive index can be made different from that of the third layer.

For a guide structure with a low refractive step index, the typical refractive index variation between the guide layer and the adjacent layers is $5.10^{-3}$ to $2.10^{-2}$ and for a structure with a high step index said index variation is typically between $10^{-1}$ and $5.10^{-1}$.

A guide with a high refractive index variation is e.g. constituted by upper and lower undoped silica layers with an index of 1.45 or which are doped with phosphorus and/or boron with an index of 1.46 and a silicon nitride guide layer with an index of 2.01 or a silicon oxynitride layer ($SiO_xN_y$ with $0<x<2$ and $0<y<4/3$) with an index of 1.45 to 2, of alumina with an index of 1.65 or organic materials such as PMMA (polymethyl methacrylate) and polyimides with an index between 1.45 and 1.7.

A light guide with a low refractive index variation is in particular constituted by upper and lower layers made from undoped silica or silica doped with fluorine and/or boron and a guide layer of silica doped with germanium, titanium, nitrogen or phosphorus.

The doping of the silica by boron or fluorine reduces its refractive index, whereas doping by germanium, phosphorus, nitrogen or titanium increases the refractive index of the silica.

The production of a diffraction grating with a very high coupling coefficient according to the invention and therefore a small number of lines or grooves (5 to 25) permits a coupling between the high index variation optical guide and the low index variation optical guide with a considerably reduced wavelength sensitivity compared with those of the prior art and in all cases compatible with the light sources, whereof the emission spectrum has widths of 10 to 20nm.

Advantageously, the gratings can work in the reflective mode, which represents the advantage of making them relatively insensitive to technological errors (grating spacings, width of the cavities and effective indices of the guided modes). Moreover, the splitting plates and mirrors according to the invention advantageously operate in the vicinity of the limit total reflection angle Al.

The invention also relates to a process for producing an optical component as defined hereinbefore.

According to a first embodiment the process comprises the following stages:
  deposition of at least one first layer on a support,
  production of at least one trench in said first layer, whose height/width ratio is $\geq 0.5$ and
  chemical vapour phase deposition (CVD) of a second layer on the first layer etched in this way, so as to form an air-filled sealed cavity in the trench.

The second layer can be deposited by low pressure CVD (LPCVD) or by plasma-assisted CVD (PECVD).

The inventors have found that this procedure of the isotropic deposition of a material layer necessarily lead to the formation of a bubble of gas, generally air, in the trench when the height/width ratio was at least 0.5. The exact composition of the air is obviously fixed by that of the gaseous atmosphere in the deposition enclosure. The volume and shape of the air bubble are dependent of the height/width ratio and the properties of the first layer.

Moreover, it is possible to modify the shape and volume of said air bubble by carrying out surface treatments of the deposited layers. In particular, it is possible to carry out a heat treatment of the first and second layers in such a way as to make them flow. This flow is in particular possible with silica layers advatageously doped with boron, phosphorus or both of them, so as to lower the treatment temperature compared with the flow temperature of the undoped silica.

As it is relatively easy to carry out etching processes, whose height/width ratio is approximately 1 to 5, it is found that the creation of said air bubble is not absolutely critical.

According to a second embodiment, the process for the production of the optical component according to the invention comprises the following stages:
  (a) deposition of at least one first layer on a support,
  (b) production of at least one trench in said first layer,
  (c) deposition of an intercalated layer in the trench and above the latter, which can be selectively eliminated with respect to the support, the first layer and a second layer,
  (d) deposition on the structure obtained in (c) of the second layer and
  (e) elimination of the intercalated material thus forming a sealed cavity filled with air in the trench.

This second embodiment has a much more general application than the first because, unlike the first embodiment, it makes it possible to produce an air bubble, whose height/width ratio is below 0.5 and is e.g. between 0.1 and 0.3.

Moreover, said second method is much more reproducible with regards to the shape of the bubbles.

According to a third embodiment, the process for the production of the optical component according to the invention comprises the following stages:
  (A) deposition of a first layer on a support,
  (B) deposition of an intercalated material layer on the first layer and which can be selectively etched with respect to said first layer, a second layer and the support, (C) etching said intercalated layer so as to form at least one intercalated material stud, (D) deposition on the structure obtained in (C) of the second layer and (E) elimination of the intercalated material stud, thus forming a sealed cavity filled with air at the location of the stud.

The three embodiments are applicable to different types of optical components as referred to hereinbefore.

As a function of the envisaged application, it is possible to replace said air bubble by a liquid or another gas, provided that the latter has a refractive index which is different or which can be made different from that of the first and second layers, by injection after the deposition of the second layer.

According to the invention, the injected liquid can be a liquid monomer polymerizable by heating or irradiation such as methyl methacrylate, which is then polymerized.

Other features and advantages of the invention can be gathered from the following illustrative and non-limitative description with reference to the attached drawings, wherein show:

FIGS. 1 (a) and (b) are already described, diagrammatically a prior art integrated optics beam splitting plate.

FIGS. 2 (a) and (b) diagrammatically the different stages in the production of an integrated optics splitting plate according to the invention.

FIGS. 4 (a) and (b) diagrammatically an integrated optics mirror according to the invention.

FIGS. 5 (a) and (b) diagrammatically a diffraction grating according to the invention.

FIGS. 6 (a) and (b) diagrammatically two active components according to the invention, whereof it is possible to electrically modify the refractive index of the filling material.

FIGS. 7 (a) and (e) diagrammatically the different production stages of a splitting plate according to a second embodiment of the invention.

FIGS. 8, to 9 (a)–(b), 10 (a)–(c) and 11 diagrammatically the different production stages of a diffraction grating for the co-directional coupling of two superimposed guides with a different guided mode profile according to four different embodiments.

Figure 2:
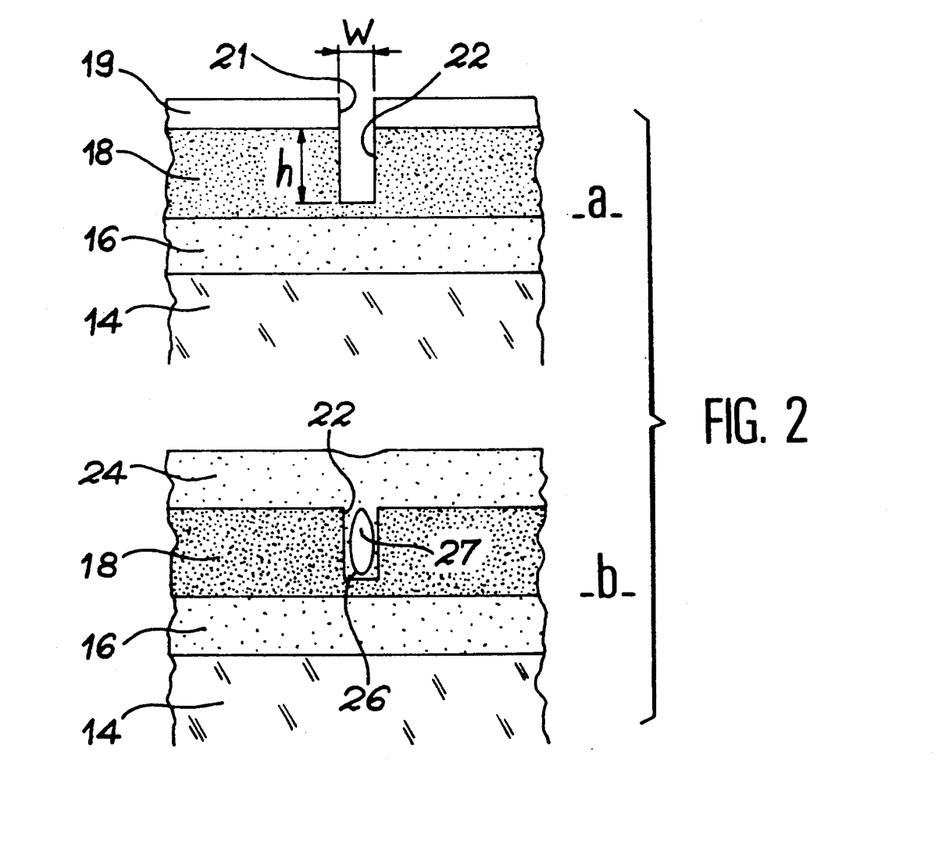
Figure 3A:
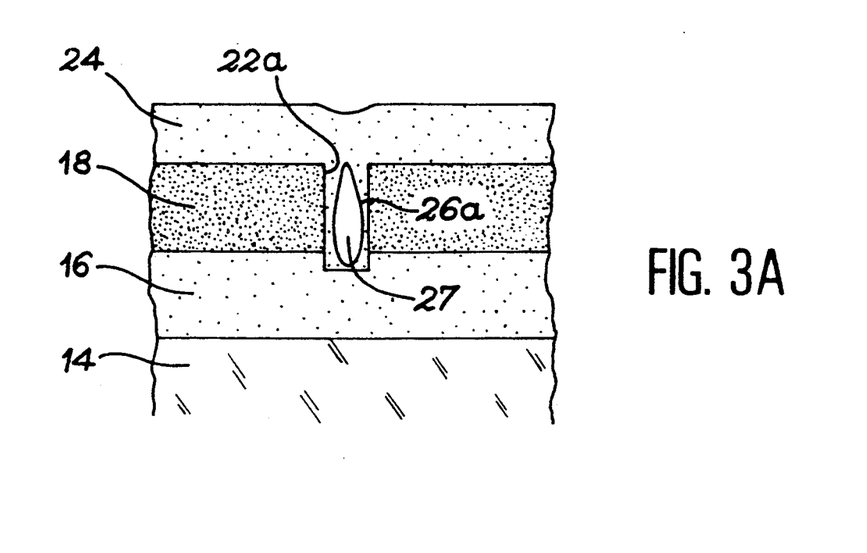
FIGS. 3A and 3B constructional variants of a splitting plate according to the invention.

FIGS. 2 and 3A diagrammatically show the production of a beam splitting plate according to the invention. It is possible to see a monocrystalline silicon substrate 14 on which has been formed an 8 to 12 micrometer thick, not intentionally doped silicon oxide layer 16, e.g. by high pressure thermal oxidation of the substrate under an oxygen atmosphere between 800° and 1200° C. The refractive index of this oxide layer 16 is approximately 1.45.

By plasma-assisted or plasma-unassisted chemical vapour phase deposition is deposited the silicon oxide guide layer 18, which is doped with phosphorus, germanium, nitrogen or titanium and has a thickness of 3.2 to 10 micrometers. Phosphorus doping is ensured by $10^{21}$ to $10^{22}$ atoms/cm$^3$. The refractive index of this layer 18 is approximately 1.46.

By conventional photolithography processes is formed a photosensitive resin mask 19 (part a, FIG. 2) having an opening 21 fixing the location of the splitting plate and its dimensions. With the aid of said mask an anisotropic etching takes place of the layer 18, thus forming a trench 22 in the area of layer 18 facing the mask opening 21. This etching is e.g. a reactive ionic etching (RIE) using CHF$_3$ or CF$_4$ as the etching agent.

It can be carried out over all or part of the thickness of the layer 18 or, as shown in FIG. 3A, it is possible to said etching to also reach the lower layer 16 of the guide, but without extending to the substrate 14. The thus formed trench carries the reference 22a.

The height of the trench is designated h and its width is designated w. According to this method, the h/w ratio is at least 0.5.

Preferably, a splitting plate has a reflection coefficient between 30 and 70%. Fundamentally it is sufficient if h is of the same order of magnitude as half the spatial extension (or spatial width of the guided mode).

In FIG. 2, h can be 3.4 micrometers and w 2.5 micrometers, whilst in FIG. 3A h can be 5 micrometers or the same value of w.

After eliminating the etching mask 19 by an oxygen plasma, deposition tkaes place of a 1 to 6 micrometers thick, not intentionally doped silicon oxide layer 24, or which optionally contains a doping agent reducing the refractive index of the oxide, such as boron or fluorine, with concentrations of $10^{21}$ to $10^{22}$ atoms/cm$^3$.

This layer is deposited by plasma-assisted chemical vapour phase deposition (PECVD) at 300° to 500° C. by thermal decomposition of silane and oxygen or by low pressure chemical vapour phase deposition (130 Pa) with the same gases (LPCVD). This layer 24 constitutes the upper layer of the light guide and provides a protection against the environment of the splitting plate.

As shown in part b of FIG. 2 and in FIG. 3A, the deposition by PECVD or LPCVD of a silica layer necessarily leads, for h/w≧0.5, to the formation of a cavity 26 or 26a containing air 27 located in the trench respectively 22,22a. The presence of this air bubble leads to a significant local modification of the effective index of the guided mode. For h/w<0.5, it is very difficult to determine the presence or absence of an air bubble by this method.

It is possible to improve the reproducibility of the shape of the bubble by bringing about a flow of the layers containing the cavity consisting of an oven treatment of the structure at between 900° and 1100° C.

For an 800 nm guided light beam, the reflection coefficient R (FIG. 1b) of the thus formed splitting plate passes from 0 to 95% when h varies from 0 to 5 micrometers, w being fixed at 2.5 micrometers. When h=3.4 micrometers, the transmission and reflection coefficients of the plate are close to 50% and the limit reflection angle Al is close to 45°.

Figure 3B:
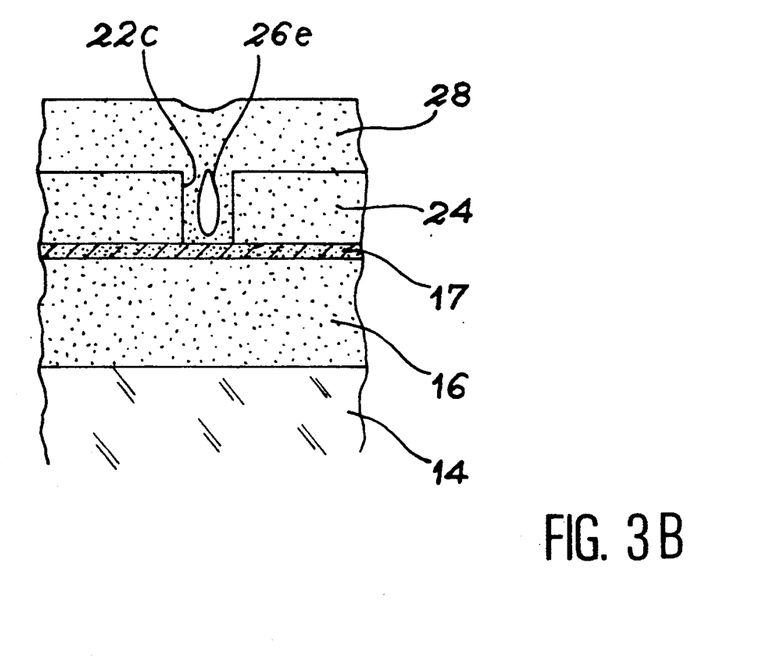

As shown in FIG. 3B, it is also possible to form the trench 22c over all or part of the upper guide layer 24. In this case, the etching of the layer 24 is followed by the deposition of a 1 to 10 micrometers thick, undoped SiO$_2$ layer 28 by PECVD or LPCVD under the same conditions as described in FIG. 2 for layer 24. Thus, an air-filled cavity 26e is formed, whose shape is fixed by the height/width ratio of the trench 22c.

In the variant shown in FIG. 3B, the guide layer 17 is made from LPCVD-deposited silicon nitride and has a thickness of 100 to 400 nm.

Figure 4:
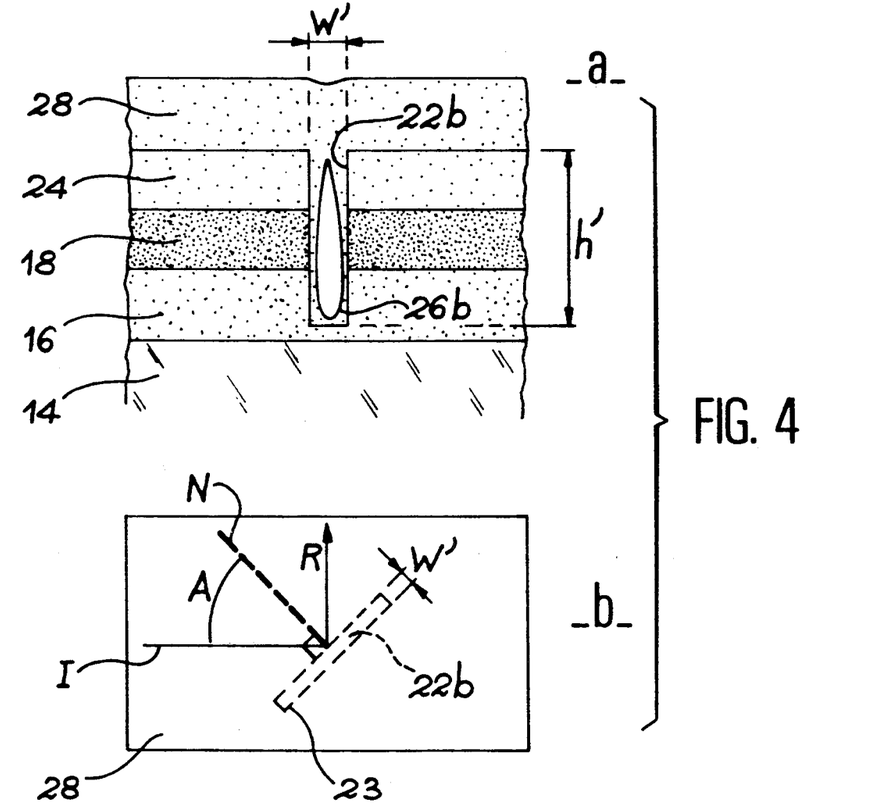

FIG. 4 diagrammatically shows an integrated mirror according to the invention. As previously, this mirror is formed in a waveguide of Si/SiO$_2$/+doped SiO$_2$/SiO$_2$. The deposition techniques and the thicknesses of the layers are identical to those described relative to FIG. 2.

Following the successive deposition of the layers 16, 18 and 24 (part a), using an appropriate mask (cf. FIG. 2a) anisotropic etching takes place of the stack of layers 16, 18 and 24. The depth of the trench 22b formed is designated h' and its width w'. This etching takes place over the entire thickness of the layers 24 and 18 and over all or part of the layer 16. The etching agents are e.g. CHF$_3$ or CF$_4$.

This etching is followed by the deposition of a 1 to 10 micrometers thick, undoped silicon oxide layer 28 by PECVD or LPCVD under the same conditions as described in FIG. 2 for the layer 24. This leads to the formation of an air bubble 26b, whose shape is fixed by the ratio h'/w' of the trench 22b.

The width w' of the trench 22b must exceed a minimum value wo, so as to avoid any recoupling of the guided mode in the guide structure. In part b of FIG. 4, I and R respectively represent the incident and reflected beams and N represents the perpendicular to the mirror defined by the trench 22b. The angle A between the perpendicular and the instant beam must exceed the total reflection angle Al defined in the equation (2):

$$Al = Arc \sin N2/N1eff \qquad (2)$$

in which N1eff is the effective index of the guided mode and N2 represents the index of the air bubble, namely 1.

In the represented example, N1eff is approximately 1.47 and Al approximately 43°. Thus, A must exceed 43°.

The above formula (2) is applicable to the mirror and corresponds to the case where the guided mode only exists in the cavity containing the fluid. However, it can be used in place of formula (1) for beam splitting plates, as a function of the value of the sought reflection coefficient.

When N1effsinA is <N2, there is merely a splitting plate and not a mirror. If the SiO$_2$ layer 18 doped with Ti, Ge, N$_2$ or P is by a 165 nm thick Si$_3$N$_4$ layer deposited by LPCVD by decomposition of silane and ammonia, an index N1eff of the guided mode close to 1.73 is obtained. Under these conditions, A must exceed 35.3° in order to have a mirror.

The evanescent wave associated with the total reflection on the mirror 22b has a penetration depth given by the function:

$$\exp(-(2\pi/\lambda) \sqrt{N1eff^2 \sin^2 A - 1} \, x)$$

This function has a value of 1/e when $$x = (\lambda/2\pi \sqrt{N1eff^2 \sin^2 A - 1}).$$

For N1eff=1.47 and A=45°, we obtain:
exp(−2,2x)=1/e and therefore x=450 nm for λ=800 nm.

If the width w' greatly exceeds 450 nm and is e.g. e or 4 micrometers practically no light energy can clear the air bubble 26b, so that the thus formed mirror has high performance characteristics. If A increases, it is possible to reduce the width w'.

To ensure that the evanescent wave associated with the total reflection does not reach the rear face 23 of the mirror, the expression:

$$2\pi/\lambda(\sqrt{N1eff^2 \sin^2 A - N2}) \, wm$$

must greatly exceed w, with wm being the minimum value of w'.

For N1eff=1.47, A=45°, N2=1 (air) and $\mu$=800 nm, wm is approximately 2 micrometers, which corresponds to an attenuation of the evanescent wave by a factor of 100. The more that A increases (moving towards $\pi/2$), the more readily the above condition can be satisfied with a low value wm.

The depth h' is not critical and it is merely necessary for it to be higher than a minimum value ho roughly equal to the spatial width of the guided mode. The spatial width of the guided mode represents the midheight width of the profile of the light intensity of the wave propagating in the guide.

Figure 5:
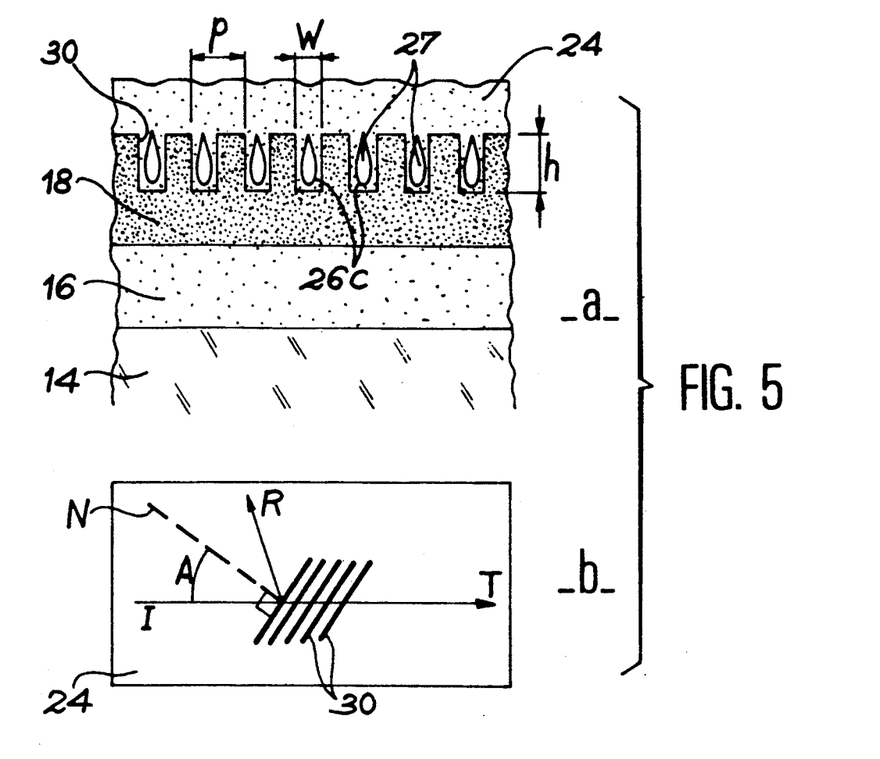

In the same way as for the semi-reflecting plate and the mirror, it is possible to produce a diffraction grating in the manner shown e.g. in the FIG. 5. The waveguide is identical to that described with reference to FIGS. 2 and 3A.

Following the deposition of the guide layer 18 on the lower layer 16 of the guide (part a), several parallel, equidistant trenches 30 are produced, w representing the width of the trenches 30 and p the spacing of the grating. The spacing of the grating p determines the the operating angle A, shown in part b of FIG. 5, which is the angle formed by the incident beam with the lines 30 of the grating.

As previously, the deposition of the SiO$_2$ layer 24 by LPCVD or PECVD on the guide layer 18 leads to the formation of bubbles and therefore to cavities 26c filled with air 27, located in each of the trenches 30.

The depth of the trenches h and the index of the material filling these trenches, in this case air, determine the coupling coefficient K between the grating and the instant beam and therefore the coupling width Lc=$\pi/2K$ of the mode guided with the grating. The creation of air bubbles 26c of index 1 increases the value of K and consequently decreases the coupling length Lc, which makes it possible to make the grating less sensitive to the wavelengths.

In view of the fact that it is difficult to control the value of the coupling coefficient K, which is highly dependent on h and the shape of the bubbles 26c, the grating is made to operate systematically in reflection. This also makes it possible to make the grating less sensitive to technological errors, particularly with respect to the value of the spacing, the width of the trenches or the effective indices of the guided modes. Thus, to the extent that the interraction length of the grating with the instant wave L greatly exceeds 1/K, i.e. Lc, the value of the reflection in the case of a grating operating in reflection is independent of Lc and therefore K and in practice L=2Lc.

According to the invention, it is possible to replace air by another gas, a liquid or a solid liquified by an appropriate heat treatment and thus to form a grating of components interconnected by channels. Thus, it is possible to render active the components described hereinbefore with reference to FIGS. 2 to 5. In particular, it is possible to replace air by C smectic or nematic liquid crystals, whose refractive index can be electrically controlled by the injection into the cavities of these liquid crystals.

Figure 6:
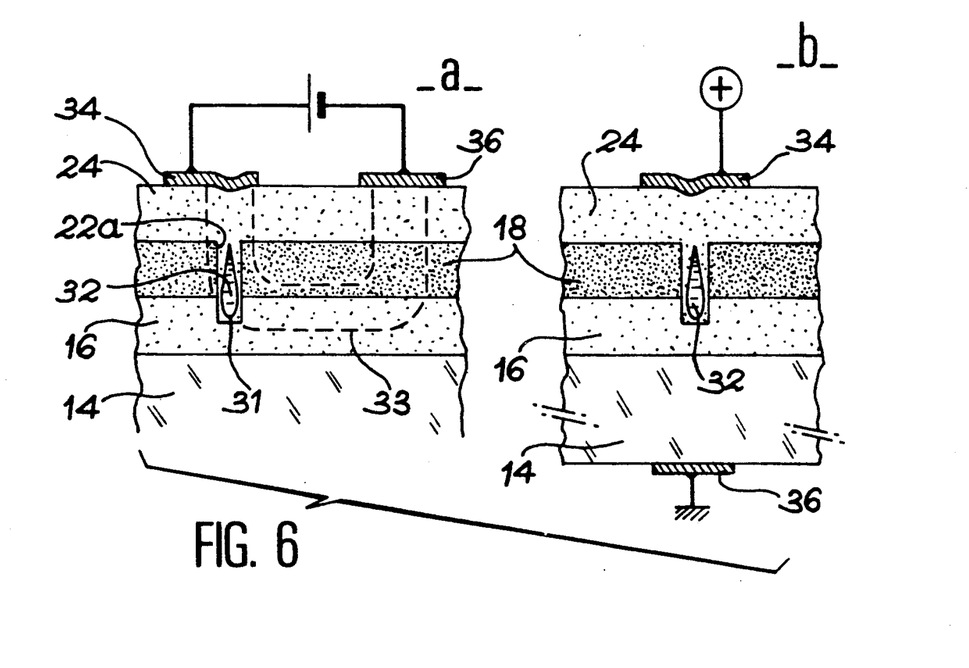

FIG. 6 shows two embodiments of active components, which are beam splitting plates, whereof it is possible to electrically control the reflection coefficient. For this purpose, the air initially present in the cavity 31 formed in the trench 22a is replaced by an C smectic liquid crystal 32 and electrodes 34, 36 made from a conductive material such as aluminium are deposited on the light guide.

As shown in part a, said electrodes 34 and 36 are placed on the layer 24, the electrode 34 being positioned facing the liquid crystal 32 or, as shown in FIG. 6, the electrode 34 is placed on the layer 24 facing the liquid crystal 32 and the electrode 36 on the rear face of the guide, i.e. on the substrate 14. The electrode 34 facing the liquid crystal is raised to a positive potential and the electrode 36 to ground.

The dotted lines 33 in FIG. 6(a) symbolise the lines of the electric field applied to the optical component.

Figure 7:
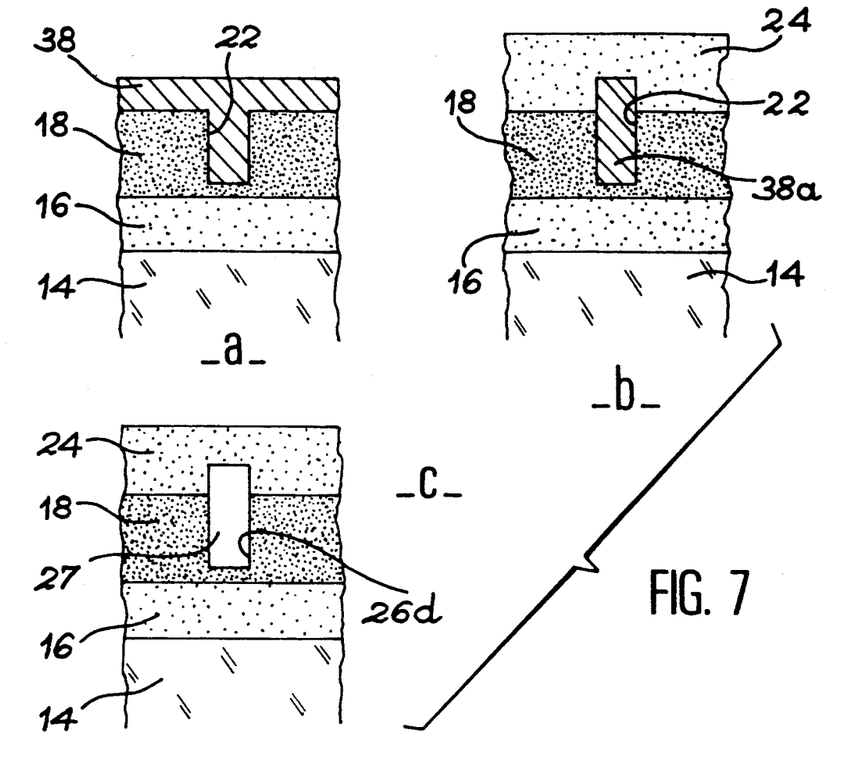

FIG. 7 shows another embodiment of the components according to the invention and in particular the production of a splitting or semi-reflecting plate. After the formation of the trench 22 by partial etching of the layer 18, on the complete structure (part a) is deposited a layer 38 of a material which can be selectively etched with respect to the layer 18 and the upper layer 24 of the optical guide. In the case of silica layers 18 and 24, it is possible to use a metal coating and in particular a coating of aluminium or chromium.

This coating 38 can be deposited by all known deposition methods and in particular by cathodic sputtering or electrolytic deposition for a metal layer. This layer has a thickness greater than that of the trench 22. For a height h of the latter of 3.4 micrometers, the layer 38 e.g. has a thickness of 10 micrometers.

This layer is then selectively etched in such a way as to retain metal at least facing the trench 22, i.e. in and above the trench (it also being possible to retain metal on either side of the trench). Said etching operation is carried out with the aid of a not shown photolithogravure mask. The metal stud obtained is designated 38a (part b).

It is also possible to directly produce the metal stud 38a filling the trench 22 by lift-off, when the trench has a width of ≧1.5 micrometers.

This is followed by the deposition of the silica layer 24. This deposition can be carried out by all known deposition methods and in particular by CVD using silane and oxygen as the deposition gases.

As shown in part c of FIG. 7, this is followed by a selective etching of the metal stud 38a leading to its complete elimination. This elimination can be carried out by chemical etching in solution from a hole, e.g. produced in the layer 24 and connected to the metal. In the case of aluminium, use is made of a phosphoric acid solution and for chromium a cerium salt solution.

This leads to a splitting plate equipped with an air-containing cavity 26d, whose shape is identical to that of the stud 38a.

This method makes it possible to use all deposition methods for constituting the layer 24. In addition, it is applicable to all values of h/w greater than 0.1, whereas the method described relative to FIG. 2 is only usable for h/w ratios greater than 0.5.

Figure 8:
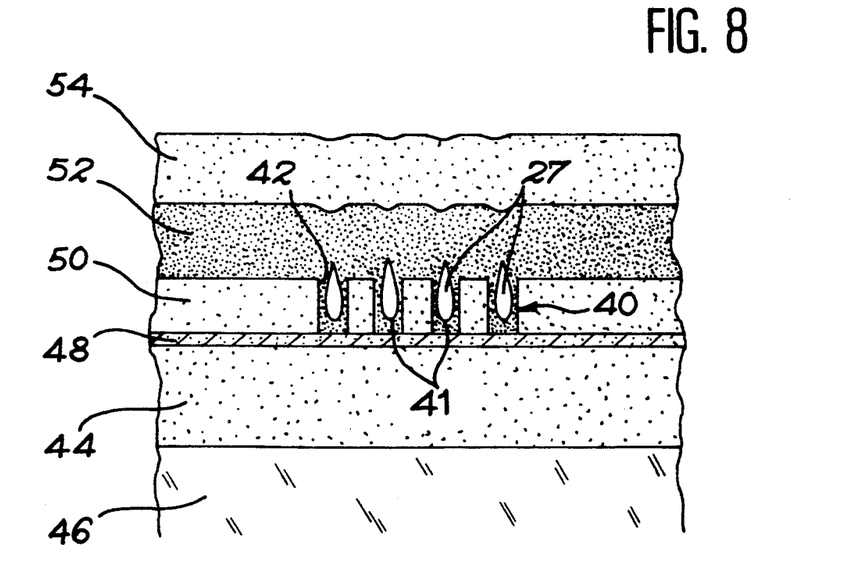

FIG. 8 diagrammatically shows two superimposed guides coupled by a high coupling force diffraction grating 40 according to the invention. The guide structure with a high refractive index variation A is e.g. constituted by a lower layer 44 having a refractive index n1 deposited on a substrate 46, a guide layer 48 of refractive index n2 and an upper layer 50 of refractive index n3, with the layer 48 intercalated between the layers 44 and 50, with n2 exceeding n1 and n3.

The low index variation guide structure B is e.g. constituted by the layer 50, a guide layer 52 of refractive index n4 and an upper layer 54 of refractive index n5 with the layer 52 intercalated between the layers 50 and 54 and n4 being greater than n3 and n5. In addition, n4 must exceed n1 and n2 must be greater than n4 (the order of superimposing the structures A and B obviously being reversible).

For a silicon substrate 46, the layers 44,50 and 54 can be made from silica, which is either not intentionally doped, or which is doped with fluorine or boron. The layer 48 can be of silicon nitride, silicon oxynitride or alumina and the layer 52 can be of silica doped with phosphorus, germanium, nitrogen or titanium. The layers 48,50,52 and 54 can be deposited by LPCVD or PECVD and the layer 44 can be formed by thermal oxidation of the substrate, so as to have good optical qualities.

The structure shown in FIG. 8 has two very different propagation modes. For said structure to be able to function, it is also necessary for the thickness of the layer 48 to be less than a maximum value in order to be monomode, which is approximately 0.05 to 0.4 micrometer as a function of the wavelengths used for the silicon nitride layer and for the thickness of the layer 52 also to be below a maximum value to be monomode, approximately 1 to 8 micrometers as a function of the wavelengths used and the index variation must be between the different layers.

In addition, the thickness e1 of the layer 44 must ensure the isolation of the two propagation modes of the guides A and B of the substrate 46. In addition, this thickness must exceed the penetration depth of the evanescent wave of the guided mode of the least confined nature propagating in the layer 52. Typically e1 exceeds 12 to 15 micrometers.

Figure 11:
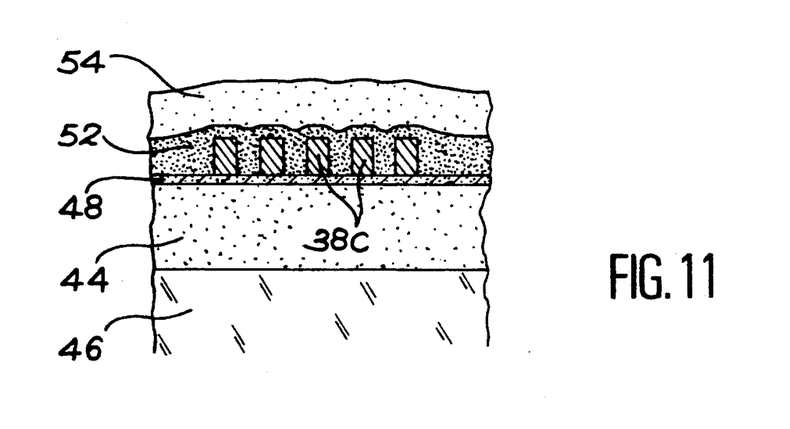

The thickness of the layer 50 conditions the coupling force of the grating and can be 0 (FIG. 11). The coupling between the two guided modes decreases with the thickness of the layer 50. Beyond 3 micrometers for the silica layers and for the silicon nitride layer 58 with a thickness of approximately 50 nm, coupling no longer exists. The thickness of the layer 54 is not critical.

In particular, the layers 44,48,50,52 and 54 respectively have a thickness of 8 to 15 micrometers, 50 to 200 nm, 0.3 to 2 micrometers, 1 to 8 micrometers and 2 to 10 micrometers.

As previously, the spacing of the grating and the incidence angle on the grating are chosen so as to enable the grating 40 to operate in reflection, so as to prevent the light energy coupled from the high index variation structure to the low index variation structure from being able to return to the high index variation structure.

The coupling between the structures A and B, via the grating, is possible when $kA + kR = kB$ with $|kA| = (2\pi/\lambda)nA$, $|kB| = (2\pi/\lambda)nB$ and $|kR| = 2\pi/p$ in which nA and nB are the effective indices of the guide structures A and B, $\lambda$ the wavelength of the incident light, p the grating spacing and $\vec{kA}$, $\vec{kB}$ and $\vec{kR}$ wave vectors of the structures A,B and the grating.

In certain special cases, it is possible to make the grating 40 function at an order different from +1 or −1, in order to increase its spacing p and thus facilitate its construction. This is only possible with a particular angle of incidence for which the orders lower than that used cannot exist.

As shown in FIG. 8, the coupling grating 40 can be obtained by etching the layer 50 just prior to depositing the guide layer 52, so as to form parallel trenches 42, whose height/width ratio is at least equal to 0.5, followed by the deposition of the layer 52 by LPCVD or PECVD, as described relative to FIG. 2.

The cavities 41 filled with air bubbles 27 formed during the deposition of the layer 52 and located in the trenches 42 ensure the coupling of the two guide structures. In practise there are 10 to 30 cavities 41 and the spacing of the grating is 0.3 to 3 micrometers.

Figure 9:
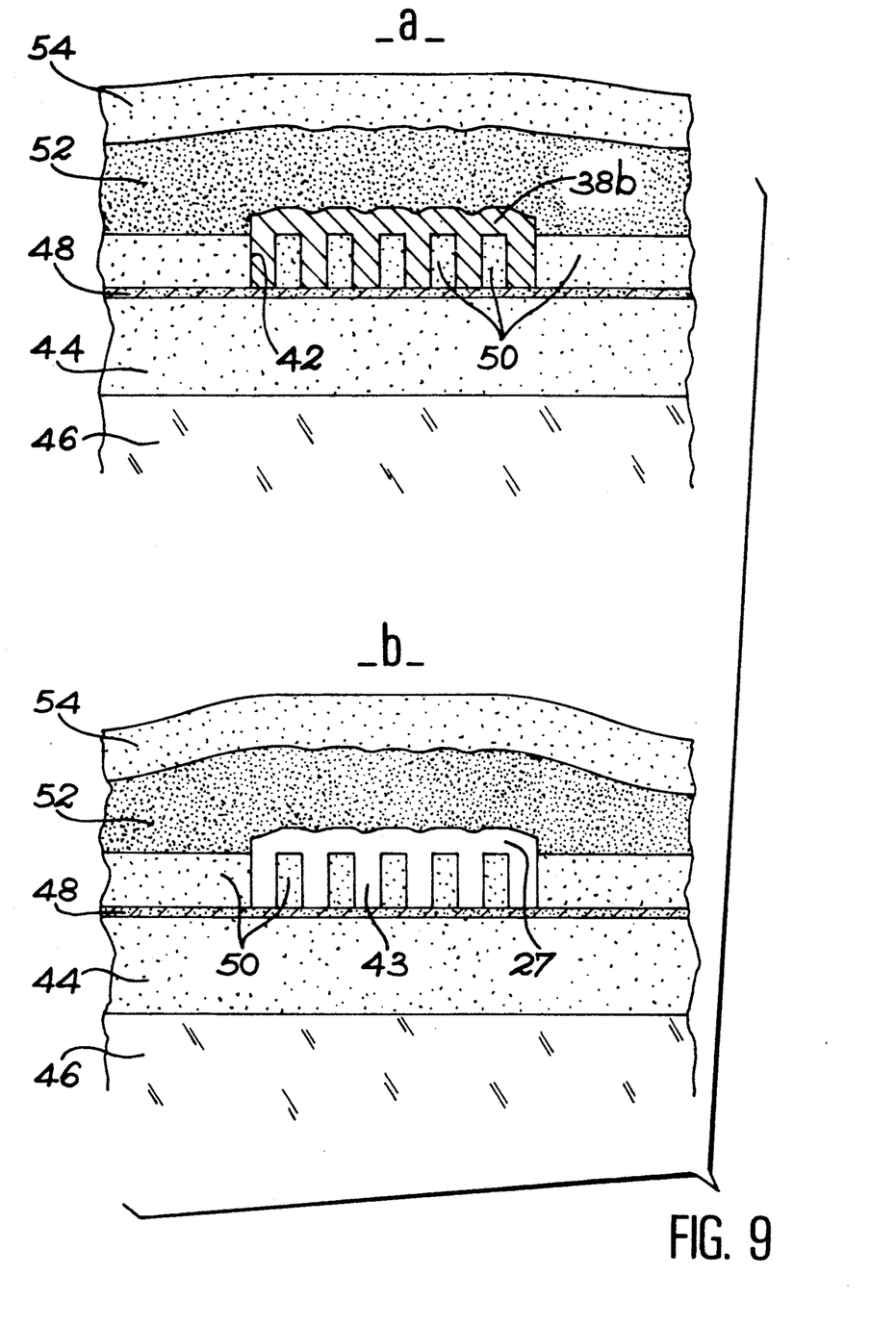

FIG. 9 shows another embodiment of the diffraction grating ensuring the coupling of the two guide structures. In this embodiment, on the etched layer 50 (part a) is effected the deposition of a metal layer which can be selectively etched with respect to the substrate 46 and the layers 44,48,50,52 and possibly 54, when the metal is eliminated following the deposition of the layer 54. This layer is then etched so as to only maintain metal 38b facing the trenches 43 made in the layer 50. The etching of this metal layer is followed by the deposition of the layers 52 and 54, as described hereinbefore relative to FIGS. 2 and 7. Obviously, layer 54 can also be deposited following the total elimination of the metal.

Finally, the metal 38b is eliminated with the aid of orthophosphoric acid for an aluminium layer and guide structures of Si/SiO$_2$/Si$_3$N$_4$/SiO$_2$/+ doped SiO$_2$/SiO$_2$ via at least one hole e.g. traversing the layers above the metal 38b. The space initially occupied by the metal 38b and in particular the trenches 43 is then filled with air 27 (part b of FIG. 9).

Figure 10:
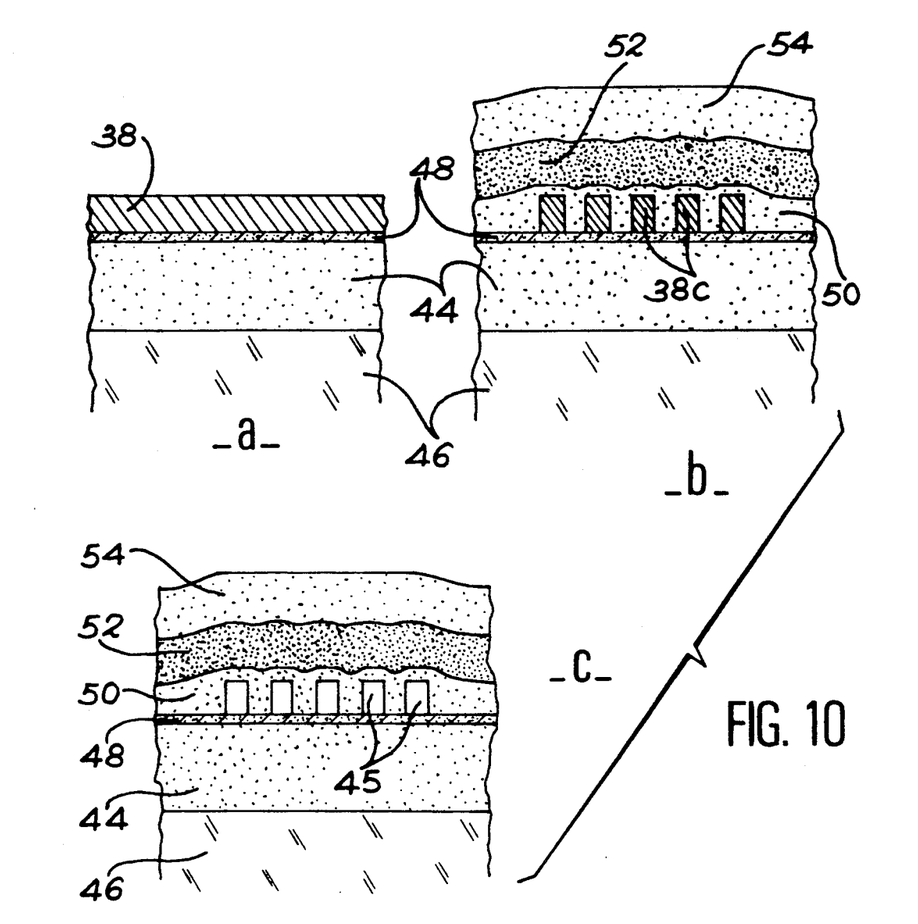

The coupling grating can also be produced in the manner shown in FIG. 10, in which the deposition of the metal layer 38 takes place directly over the entire guide layer 48 (part a of FIG. 10). This is followed by a substantially anisotropic etching of the layer 38, so as to form parallel, equidistant metal studs 38c. For an aluminium layer, said anisotropic etching is carried out by the dry method using a chlorinated gas or by the wet method with orthophosphoric acid as the etching agent.

Then, in successive manner, is carried out the deposition of the layers 50, 52 and 54 (part b), as described hereinbefore. This is followed by the elimination of the etched metal studs 38c using the wet method and giving rise to air-filled cavities 45.

The layers 52 and 54 can in this case be provided before or after the elimination of the metal studs. In order to be eliminated, said metal studs are interconnected in the layer 50, outside the useful zone of the component, at least one hole made in the layer 50 giving access to the metal 38.

This method can cause certain difficulties for very small grating spacings below 1 micrometer with respect to the elimination of the metal studs 38c, which is not the case with the process described relative to FIG. 9.

In the embodiment shown in FIG. 10, the layer 50 can have a zero thickness, as shown in FIG. 11. In this case, there is a direct deposition of the layer 52 on the metal studs 38c. Before or after the deposition of the layer 54, elimination takes place of the studs in the manner described hereinbefore.

In the embodiment of FIG. 9, it is also possible to eliminate the layer 50. In this case, the metal layer is deposited on layer 48 in whcih have been produced the parallel trenches 42.

FIGS. 5 and 8 to 11 show gratings with constant spacings and which consequently function with collimated incident beams. For uncollimated incident beams and therefore associated with source points, it is possible to use gratings identical to those shown associated with collimation optics of the integrated lens or mirror type according to the invention, or to use a grating, whose lines are eliptical or parabolic, or to use a variable spacing grating ensuring both the coupling and imaging functions. This makes it possible, in certain cases, to reduce the number of components of a complete optical circuit.

As a result of the coupling grating according to the invention, it is possible to produce polarization separators or polarization converters.

Thus, the low index variation guide structures are insensitive to the polarization of the incident beam, unlike in the case of high index variation guide structures. It is also very difficult to spatially separate or more simply select one of the transverse electric TE or transverse magnetic TM polarization of the guide mode in a low index variation structure.

Conversely, this is possible by superimposing two guides, in the manner described hereinbefore and coupled by gratings according to the invention.

It is also possible to produce a polarization converter for optical reading circuits associated with a magnetic reading/writing head, as described in FR-A-2 606 921.

Obviously, the air contained in the cavities of the network can be replaced by another gas or liquid, whereof it is possible to electrically and/or optically modify the refractive index.

Moreover, the production processes for a grating described hereinbefore can also be applied to the production of mirrors, splitting plates and lenses according to the invention.

Finally, the components according to the invention can be made from materials other than those referred to hereinbefore and can in particular be of lithium tantalate or niobate.

Figure 12:
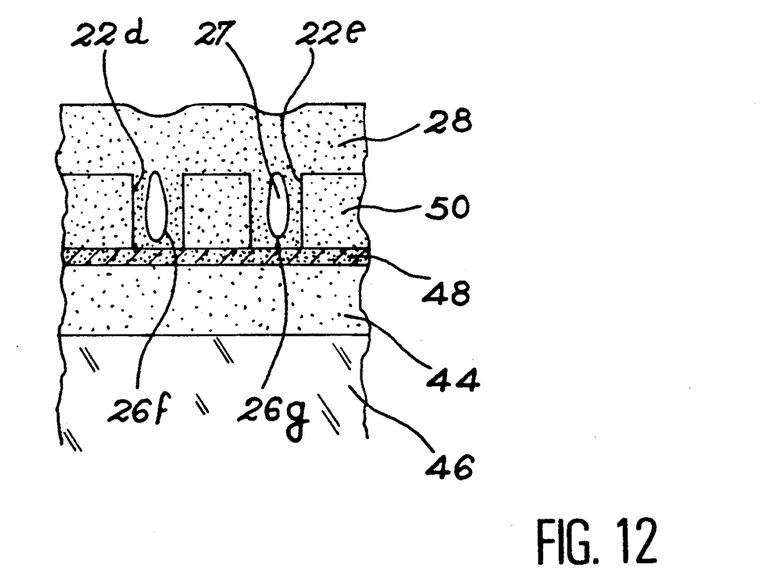
FIG. 12 diagrammatically an optical microguide according to the invention.

FIG. 12 shows a microguide according to the invention produced in a Si/SiO$_2$/Si$_3$N$_4$/SiO$_2$ guide structure. This microguide has in its upper SiO$_2$ layer 50, two air-filled cavities 26f, 26g. The index difference between the air and the silica of the layer 50 ensures a good lateral confinement of the light. These cavities are obtained by producing two parallel trenches 22d,22e in the layer 50 and then depositing an undoped SiO$_2$ layer 28 by LPCVD or PECVD.

It is also possible to ensure the lateral confinement of the light by producing two air-filled cavities in the lower layer 44 of the guide by the process described relative to FIGS. 9 or 10. The trenches can be formed in all or part of the layer 50 or 44, but not in the guide layer 48.

Figure 13:
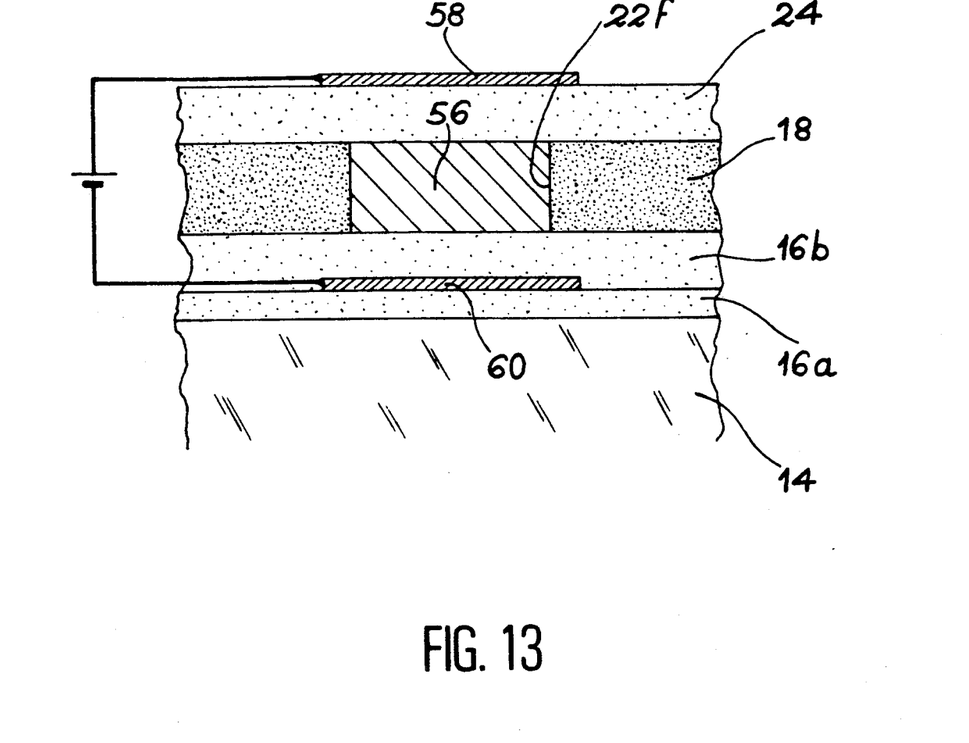
FIG. 13 diagrammatically another embodiment of an active component according to the invention and which is electrically controllable.

FIG. 13 shows another embodiment of an active component according to the invention of the beam splitting plate type, whereof it is possible to electrically control the reflection coefficient. This component is produced in a Si/SiO$_2$/+ doped SiO$_2$/SiO$_2$ guide structure.

This component has in its guide layer 18 a trench 22f filled with an organic polymer 56, whereof it is possible to modify the refractive index by applying to it a voltage via aluminium electrodes 58 and 60 parallel to the layers of the guiding structure and in particular the polymer 56.

The upper electrode 58 is placed on the upper layer 24 of the guide facing the polymer 56. The lower electrode 60 is positioned in the layer 16, constituted in the present case for practical reasons by two superimposed layers 16a and 16b of the same composition.

We claim:

1. An environmentally protected integrated optical component having at least one sealed cavity isolated from the environment and formed in at least one layer by a light guide, said cavity being filled with a material having a refractive index which can be electrically and/or optically made different than the refractive index of said layer, and having means for modifying the refractive index of said material.

2. The optical component according to claim 1, wherein the material is chosen from the group consisting of gases, $CS_2$ and organic polymers.

3. The optical component according to claim 1, wherein the material has a refractive index lower than the refractive index of said layer.

4. The optical component according to claim 1, wherein the cavity has a height/width ratio of $\geq 0.1$.

5. The optical component according to claim 1, wherein the cavity has a height/width ratio between 1 and 5.

6. The optical component according to claim 1, wherein the light guide comprises a lower layer, a guide layer, an upper layer and a convering layer stacked on a substrate, the guide layer having a refractive index higher than the refractive index of the lower, upper and covering layers, and wherein the cavity is located in at least one of the lower, guide and upper layers.

7. The optical component according to claim 1, wherein the light guide comprises an upper layer and a lower silica layer, positioned on either side of a guide layer of one of silicon nitride, silica doped with a doping agent increasing its refractive index or $SiO_xN_y$ with $0<x<2$ and $0<y<4/3$.

8. An optical component of the diffraction grating type according to claim 1, comprising several cavities arranged parallel to one another and filled with said material, said cavities constituting the lines of the grating.

9. The optical component of the grating type according to claim 8, wherein the light guide comprises a lower layer, a guide layer, an upper layer and a covering layer stacked on a substrate, the guide layer having a refractive index higher than the refractive index of the lower, upper and covering layers, the cavities being located in the guide layer or in the upper layer.

10. An optical component of the mirror type according to claim 1, wherein the light guide comprises a lower layer, a guide layer, an upper layer and a covering layer stacked on a substrate, the guide layer having a refractive index higher than the refractive index of the lower, upper and covering layers and wherein the cavity extends from the upper layer to the lower layer of the light guide.

11. An optical component of the splitter type according to claim 6, wherein the cavity is essentially located in the upper layer of the light guide.

12. An optical component of the microguide type according to claim 1, comprising two parallel cavities filled with said material.

13. An environmentally protected integrated optical coupler for coupling first and second superimposed light guides with very different index variations, wherein the first guide consists of a first upper layer and a first lower layer on either side of a first guide layer with a refractive index higher than the refractive index of the first upper and lower layers and the second guide consists of a second upper layer and a second lower layer on either side of a second guide layer with a refractive index higher than the refractive index of the second lower and upper layers, the first upper layer and the second lower layer constituting one and the same coupling layer in which are provided several cavities carrying a material having a refractive index which is different or which can be made different than the refractive index of the coupling layer, said cavities being isolated from the environment.

14. The coupler according to claim 13, wherein the first and second lower and upper layers are of silica, the first guide layer is of $Si_3N_4$ or $SiO_xN_y$ with $0<x<2$ and $0<y<4/3$, the second guide layer is of silica doped with a doping agent increasing its refractive index and the cavities are filled with air.

15. An environmentally protected integrated optical coupler for coupling first and second superimposed light guides with very different index variations, wherein the guides have a first, a second, a third and a fourth stacked layers, the second and third layers constituting the guide layers respectively of the first and second guides and having refractive indices higher than those of the first and fourth layers, the refractive index of the second layer also being different from that of the third layer, said third layer having cavities filled with a material having a refractive index which is different or which can be made different than the refractive index of the third layer, said cavities being isolated from the environment.

16. The coupler according to claim 15, wherein the first and fourth layers are of silica, the second layer is of $Si_3N_4$ and the third layer is of silica doped with a doping agent increasing its refractive index and wherein the cavities are filled with air.

17. A process for producing an environmentally protected integrated optical component having at least one sealed cavity isolated from the environment and formed in at least one layer of a light guide, said cavity being filled with a material having a refractive index which is different or which can be made different than the refractive index of said layer, said process comprising the following stages:
depositing at least one first layer on a support,
producing at least one trench in said first layer by etching said first layer, said trench having a height and a width such that height/width ratio is $\leq 0.5$, and
chemical vapor phase depositing (CVD) a second layer on the thus etched first layer, forming an air-filled sealed cavity in the trench wherein said air in said sealed cavity in the gas present is the environment during manufacture.

18. The process according to claim 17, wherein the second layer is deposited by plasma-assisted or low pressure CVD.

19. The process according to claim 17, wherein a heat treatment is performed on the first and/or second layers in order to yield said first and/or second layers.

20. A process for producing an environmentally protected integrated optical component having at least one sealed cavity isolated from the environment and formed in at least one layer of a light guide, said cavity being filled with a material having a refractive index which is different or which can be made different to the refractive index of said layer, said process comprising the following stages:
  (a) depositing at least one first layer on a support,
  (b) producing at least one trench in said first layer,
  (c) depositing an intercalated material in the trench and above said trench, which can be selectively eliminated with respect to the support, the first layer and a second layer,
  (d) depositing on the structure obtained in (c) the second layer, and
  (e) eliminating the intercalated material, thus forming a cavity filled with air in the trench wherein said air is the gas present in the environment during manufacture.

21. A process for producing an environmentally protected integrated optical component having at least one sealed cavity isolated from the environment and formed in at least one layer of a light guide, said cavity being filled with a material having a refractive index which is different or which can be made different to the refractive index of said layer, said process comprising the following stages:
  (a) depositing a first layer on a support,
  (b) depositing an intercalated material layer on the first layer, which can be selectively etched with respect to said first layer, a second layer and the support,
  (c) etching said intercalated layer so as to form at least one intercalated material stud,
  (d) depositing on the structure obtained in (c) the second layer, and
  (e) eliminating the intercalated material stud, thus forming an air-filled sealed cavity at the location of the stud wherein said air in the cavity is the gas present in the environment during manufacture.

22. The process according to any one of claims 17, 20 or 21, wherein a fluid other than air having a refractive index which is different or which can be made different to the refractive index of the first and second layers is injected into said cavity.

23. The process according to any one of claims 17, 20 or 21, wherein a polymerizable, liquid organic monomer, said organic monomer being polymerized, is injected into said cavity.

24. An environmentally protected integrated optical component having at least one sealed cavity isolated from the environment and formed in at least one layer of a light guide, said cavity being filled with a gaseous material having a refractive index which is different from the refractive index of said layer, wherein said light guide comprises a lower layer, a guide layer, an upper layer and a covering layer stacked on a substrate, the guide layer having a refractive index higher than the refractive index of the lower, upper and covering layers, and wherein the cavity is located in at least one of the lower, guide and upper layers.

25. The optical component according to claim 24, wherein said gaseous material is air which is the gas present in the environment during manufacture.

26. The optical component according to claim 24, wherein the cavity has a height/width ratio of $\geq 0.1$.

27. The optical component according to claim 24, wherein the cavity has a height/width ratio between 1 and 5.

28. The optical component according to claim 24, wherein the light guide comprises an upper layer and a lower silica layer, positioned on either side of a guide layer of silicon nitride, silica doped with a doping agent increasing its refractive index or $SiO_xN_y$ with $0<x<2$ and $0<y<4/3$.

29. An optical component of the diffraction grating type according to claim 24, comprising several cavities arranged parallel to one another and filled with said material, said cavities constituting the lines of the grating.

30. The optical component of the grating type according to claim 29, wherein the light guide comprises a lower layer, a guide layer, an upper layer and a covering layer stacked on a substrate, the guide layer having a refractive index higher than the refractive index of the lower, upper and covering layers, the cavities being located in the guide layer or in the upper layer.

31. An optical component of the mirror type according to claim 24, wherein the light guide comprises a lower layer, a guide layer, an upper layer and a covering layer stacked on a substrate, the guide layer having a refractive index higher than the refractive index of the lower, upper and covering layers and wherein the cavity extends from the upper layer to the lower layer of the light guide.

32. An optical component of the splitter type according to claim 24, wherein the cavity is essentially located in the upper layer of the light guide.

33. An optical component of the microguide type according to claim 24, comprising two parallel cavities filled with said material.

34. An environmentally protected integrated optical component having at least one sealed cavity isolated from the environment and formed in at least one layer of a light guide, said cavity being filled with a gaseous material having a refractive index which is different from the refractive index of said layer wherein said component includes a support, at least one first layer deposited on said support, a cavity filled with a gas, and a second layer deposited on said first layer in such a way that said cavity is sealed and isolated from the environment.

35. The optical component according to claim 34, wherein said gaseous material is air which is the gas present in the environment during manufacture.

36. The optical component according to claim 34, wherein the cavity has a height/width ratio of greater than or equal to 0.1.

37. The optical component according to claim 34, wherein the cavity has a height/width ratio between 1 and 5.

38. The optical component according to claim 34, wherein the light guide comprises an upper layer and a lower silica layer, positioned on either side of a guide layer of silicon nitride, silica doped with a doping agent increasing its refractive index or $SiO_xN_y$ with x being greater than 0 and less than 2 and with y being greater than 0 and less than 4/3.

39. An optical component of the diffraction grating type according to claim 34, comprising several cavities arranged parallel to one another and filled with said material, said cavities constituting the lines of the grating.

40. The optical component of the diffraction grating type according to claim 39, wherein the light guide comprises a lower layer, a guide layer, an upper layer and a covering layer stacked on a substrate, the guide layer having a refractive index higher than the refractive index of the lower, upper and covering layers, the cavities being located in the guide layer or in the upper layer.

41. An optical component of the mirror type according to claim 34, wherein the light guide comprises a lower layer, a guide layer, an upper layer and a covering layer stacked on a substrate, the guide layer having a refractive index higher than the refractive index of the lower, upper and covering layers and wherein the cavity extends from the upper layer to the lower layer of the light guide.

42. An optical component of the splitter type according to claim 34, wherein the cavity is essentially located in the upper layer of the light guide.

43. An optical component of the microguide type according to claim 34, comprising two parallel cavities filled with said material.

44. An environmentally protected integrated optical component having at least one sealed cavity isolated from the environment and formed in at least one layer of a light guide, said cavity being filled with a gaseous material having a refractive index which is different from the refractive index of said layer wherein said light guide comprises a lower layer, a guide layer and an upper layer which are stacked, said guide layer having a refractive index higher than the refractive index of the lower and upper layers and being disposed between said upper and lower layers and wherein the cavity is formed in at least one of said lower, guide and upper layers.

45. The optical component according to claim 44, wherein said gaseous material is air which is the gas present in the environment during manufacture.

46. The optical component according to claim 44, wherein the cavity has a height/width ratio of greater than or equal to 0.1.

47. The optical component according to claim 44, wherein the cavity has a height/width ratio between 1 and 5.

48. The optical component according to claim 44, wherein the light guide comprises an upper layer and a lower silica layer, positioned on either side of a guide layer of silicon nitride, silica doped with a doping agent increasing its refractive index or $SiO_xN_y$ with x being greater than zero and less than 2 and with y being greater than 0 and less than 4/3.

49. An optical component of the diffraction grating type according to claim 44, comprising several cavities arranged parallel to one another and filled with said material, said cavities constituting the lines of the grating.

50. The optical component of the diffraction grating type according to claim 49, wherein the light guide comprises a lower layer, a guide layer, an upper layer and a covering layer stacked on a substrate, the guide layer having a refractive index higher than the refractive index of the lower, upper and covering layers, the cavities being located in the guide layer or in the upper layer.

51. An optical component of the mirror type according to claim 44, wherein the light guide comprises a lower layer, a guide layer, an upper layer and a covering layer stacked on a substrate, the guide layer having a refractive index higher than the refractive index of the lower, upper and covering layers and wherein the cavity extends from the upper layer to the lower layer of the light guide.

52. An optical component of the splitter type according to claim 44, wherein the cavity is essentially located in the upper layer of the light guide.

53. An optical component of the microguide type according to claim 44, comprising two parallel cavities filled with said material.

* * * * *